Sept. 11, 1945.     V. L. DARBY     2,384,729

FLOATING NUT

Filed March 18, 1944

INVENTOR.
Vene L. Darby
BY
Lynn Latta
Attorney

Patented Sept. 11, 1945

2,384,729

UNITED STATES PATENT OFFICE 2,384,729

FLOATING NUT

Vene L. Darby, Inglewood, Calif., assignor to North American Aviation, Inc.

Application March 18, 1944, Serial No. 527,019

5 Claims. (Cl. 85—32)

This invention relates to floating nuts, and has as its general object, to provide an improved floating nut arrangement which may be embodied in a spline nut, a basket nut, or a channel nut structure.

A more specific object of the invention is to provide a floating nut structure in which the nut has greater freedom of movement for the purpose of adjusting itself to a bolt than in previous floating nut structures.

A further object of the invention is to provide a floating nut arrangement of greater simplicity than nut structures of previous arrangements.

In the drawing, like reference characters designate similar parts in the several views.

Figure 1:
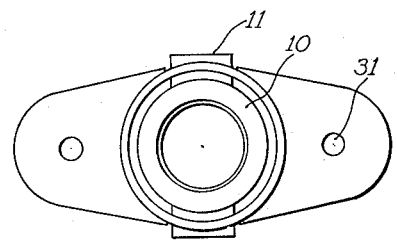
Fig. 1 is a plan view of a basket nut embodying the invention.
Figure 2:
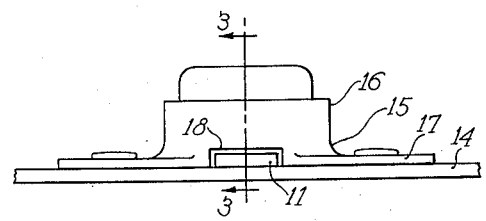
Fig. 2 is a side elevation of the same.
Figure 3:
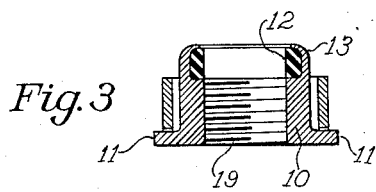
Fig. 3 is a transverse sectional view of the same, taken on the line 3—3 of Fig. 2.

As an example of one form in which the invention may be embodied I have shown in Figs. 1 to 3 inclusive, a basket nut embodying a nut 10 having ears 11 formed thereon in diametrically opposed relation and flush with one axial extremity of the nut. Nut 10 may embody a locking ring 12 of deformable material, caged in a channel 13 in the end of the nut opposite the ears 11.

The nut 10 is floatingly mounted on a supporting member 14 by means of a "basket" 15 which may conveniently be formed of sheet metal and which includes a collar 16 and a pair of ears 17 having openings 31 by means of which the "basket" is riveted to the supporting member 14. As an alternative securing means, the ears may be spot-welded to the support.

The collar 16 is provided with notches 18 which receive the ears 11, the nut 10 being disposed within the collar 16 and retained therein by the confinement of the ears 11 between the notches 18 and the supporting member 14. The nut 10 has radial clearance within the collar 16 and the ears 11 have circumferential and axial clearance in the notches 18. Thus the nut may freely move a limited distance in any direction in order to align the threaded aperture 19 thereof with a bolt extended through the supporting member 14.

Figure 4:
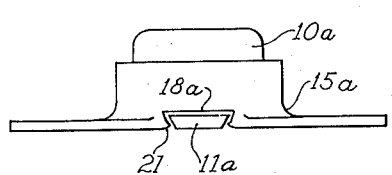
Fig. 4 is a side elevation of a modified form of the invention.

In the modification of the basket nut shown in Fig. 4, the nut 10a is pre-assembled in the "basket" 15a, the ears 11a being dovetail shaped in cross-section and the corners of the notches 18a being staked as at 21, so as to underhang the wider edges of the ears 11a.

Figure 5:
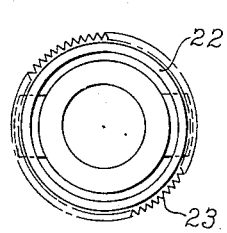
Fig. 5 is a plan view of a spline nut embodying the invention.
Figure 6:
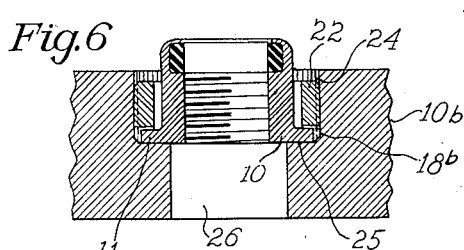
Fig. 6 is a sectional view through a spline nut installation embodying the spline nut of Fig. 5.
Figure 7:
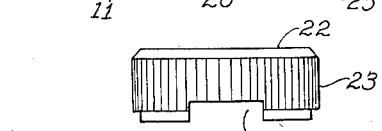
Fig. 7 is a side elevation of the spline sleeve.

In Figs. 5, 6 and 7, I have illustrated the invention embodied in a spline nut arrangement including the nut 10 previously described and a sleeve 22, which has external splines 23 adapted to be anchored in a counterbore 24 in a supporting member 10b. The sleeve 22 has notches 18b which receive the ears 11 of the nut 10 and confine them against a shoulder 25 defined between the bolt-receiving opening 26 of the supporting member 10b and the counterbore 24.

The spline nut is assembled by first dropping the nut 10 into the counterbore 24 and then driving the sleeve 22 into the counterbore 24, taking care that the ears 11 are aligned with the notches 18 during the latter stage of driving movement.

Figure 8:
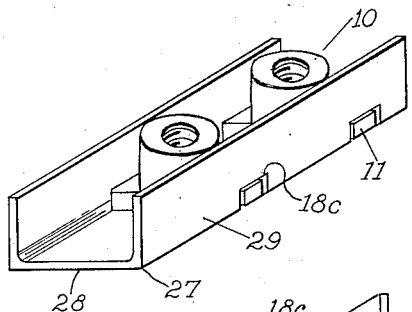
Fig. 8 is a perspective view of a portion of a channel nut structure embodying the invention.
Figure 9:
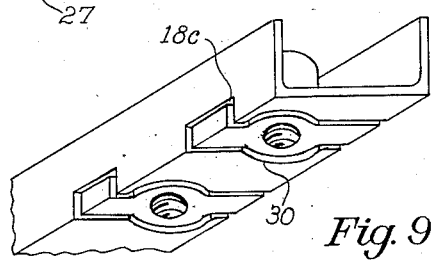
Fig. 9 is an inverted, oblique view of the same.

In Figs. 8 and 9 I have shown the invention embodied in a channel nut assembly, including a plurality of nuts 10 having ears 11, and including a channel 27 having a web portion 28 and side flanges 29, with notches 18c formed in the side flanges 29 and extended into the web 28 to form openings 30 corresponding to the contour of the lower faces of the nuts 10. The openings 30 are larger than the nuts 10 so as to permit the same to float between the channel and the member to which the channel is secured.

The invention has the advantage of simplicity of construction and assembly of the parts thereof. Since the retaining notches open into one face of the retaining member (the basket, the spline collar or the channel as the case may be), the assembling operation involves simply the dropping of the nuts into place, and does not require a forming operation on the retainer after the nut has been assembled therein, or the springing of the nut into the retainer, as is true of floating nut arrangements previously available. The member upon which the nut assembly is secured forms part of the means for confining the nut in place. The retainer (basket, spline collar or channel) is thus of simpler construction and less expensive, and the assembling operation is facilitated. Another advantage of employing open notches resides in the fact that such notches may be formed with smoother surfaces than is possible where openings are lanced through the retaining member. If necessary, the edges of the notches can be milled, or otherwise machined to a clean finish. Furthermore, they can be made definitely rectangular to conform to the cross-section of the ears 11, whereas it is difficult to secure a clean rectangular shape in a lanced opening. Consequently in the assembled nut structure, the ears have much greater freedom of movement in the confining notches than in previous structures. This has been established by actual test. The open notch construction also makes it possible to reduce the overall size of the retaining member, without sacrificing strength.

The invention provides a floating spline nut arrangement where, insofar as I am aware, no floating spline nut has been previously available.

The foregoing may be taken as illustrative of one form in which the invention may be embodied, it being our intention to cover in our claims the use of any equivalent arrangement or apparatus.

I claim as my invention:

1. A spline nut assembly including, in combination with a supporting member having a bolt-receiving opening merging with a counterbore through an offset shoulder, a nut having a pair of opposed ears resting against said shoulder, and a collar having external splines driven into said counterbore and having opposed notches receiving said ears and cooperating with said shoulder to confine said ears for floating movement.

2. A floating nut assembly including a nut having a body portion and ears extending laterally outwardly from said body portion, a retaining member for said nut, a supporting member to which said retaining member is secured, and notches in said retaining member to receive the laterally extending ears on the body portion, said notches being originally open and cooperating with the supporting member when the retaining member and the supporting member are secured together to confine the said laterally extending ears and hold the body portion of the nut against rotative movement beyond predetermined limits.

3. A floating nut assembly including a nut having a body portion and ears extending laterally outwardly from said body portion, a retaining member for said nut having a collar for encircling the body portion of the nut, a supporting member to which said retaining member is secured, and notches in said retaining member to receive the laterally extending ears on the body portion, said notches being originally open and cooperating with the supporting member when the retaining member and the supporting member are secured together to confine the said laterally extending ears and hold the body portion of the nut against rotative movement beyond predetermined limits.

4. A floating nut assembly including a nut having a body portion and ears extending laterally outwardly from said body portion, a retaining member for said nut having a collar for encircling the body portion of the nut and ears for securing the collar to a supporting member, a supporting member to which said retaining member is secured, and notches in said retaining member to receive the laterally extending ears on the body portion, said notches being originally open and cooperating with the supporting member when the retaining member and the supporting member are secured together to confine the said laterally extending ears and hold the body portion of the nut against rotative movement beyond predetermined limits.

5. A floating nut assembly including a nut having a body portion and ears extending laterally outwardly from said body portion, a retaining member for said nut, a supporting member to which said retaining member is secured, and notches in said retaining member to receive the laterally extending ears on the body portion, said notches being originally open and cooperating with the supporting member when the retaining member and the supporting member are secured together to confine the said laterally extending ears and hold the body portion of the nut against rotative movement beyond predetermined limits, the ears and the notches being of such relative size as to permit limited movement of the nut in circumferential and axial directions.

VENE L. DARBY.

CERTIFICATE OF CORRECTION.

Patent No. 2,384,729. September 11, 1945.

VENE L. DARBY.

It is hereby certified that error appears in the above numbered patent requiring correction as follows: In the drawing, Fig. 9 should appear as shown below instead of as shown in the patent -

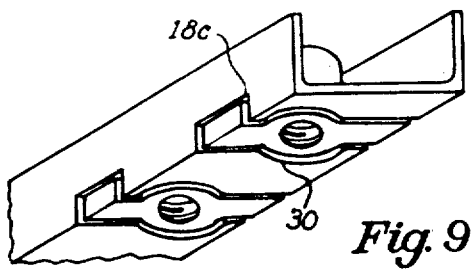

and that the said Letters Patent should be read with this correction therein that the same may conform to the record of the case in the Patent Office.

Signed and sealed this 5th day of February, A. D. 1946.

Leslie Frazer
First Assistant Commissioner of Patents.

(Seal)